(12) United States Patent
Lee

(10) Patent No.: US 9,958,998 B2
(45) Date of Patent: May 1, 2018

(54) MESH-TYPE ELECTRODE PATTERN AND MANUFACTURING METHOD THEREOF, AND TOUCH PANEL INCLUDING THE SAME

(71) Applicant: Samsung Display Co., Ltd., Yongin-si (KR)

(72) Inventor: Seung Jin Lee, Suwon-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days. days.

(21) Appl. No.: 15/044,368

(22) Filed: Feb. 16, 2016

(65) Prior Publication Data

US 2016/0306464 A1 Oct. 20, 2016

(30) Foreign Application Priority Data

Apr. 14, 2015 (KR) ........................ 10-2015-0052686

(51) Int. Cl.
*G06F 3/045* (2006.01)
*G06F 3/044* (2006.01)

(52) U.S. Cl.
CPC .... *G06F 3/044* (2013.01); *G06F 2203/04103* (2013.01); *G06F 2203/04112* (2013.01)

(58) Field of Classification Search
CPC . G06F 2203/04103; G06F 2203/04112; G06F 3/044
See application file for complete search history.

(56) References Cited

U.S. PATENT DOCUMENTS

| 2014/0055380 A1* | 2/2014 | Han | G06F 3/041 345/173 |
|---|---|---|---|
| 2014/0198264 A1 | 7/2014 | Gao et al. | |
| 2014/0218325 A1* | 8/2014 | Iwami | B32B 7/02 345/173 |
| 2015/0015980 A1 | 1/2015 | Iwami | |

FOREIGN PATENT DOCUMENTS

| JP | 2013-093014 | 5/2013 |
|---|---|---|
| JP | 2014-010671 | 1/2014 |
| KR | 10-2014-0025922 | 3/2014 |
| KR | 10-2014-0129335 | 11/2014 |

* cited by examiner

*Primary Examiner* — Insa Sadio
(74) *Attorney, Agent, or Firm* — H.C. Park & Associates, PLC

(57) ABSTRACT

An electrode pattern includes unit patterns having a mesh-shape, the unit patterns connected to each other and including a first unit pattern and a second unit pattern, in which each of the first and second unit patterns includes sides connected to each other, an area of the first unit pattern is smaller than an area of the second unit pattern, and at least one side of the first unit pattern has a line width smaller than a line width of one side of the second unit pattern.

19 Claims, 14 Drawing Sheets

MESH-TYPE ELECTRODE PATTERN AND MANUFACTURING METHOD THEREOF, AND TOUCH PANEL INCLUDING THE SAME

CROSS-REFERENCE TO RELATED APPLICATION

This application claims priority from and the benefit of Korean Patent Application No. 10-2015-0052686, filed on Apr. 14, 2015, which is hereby incorporated by reference for all purposes as if fully set forth herein.

BACKGROUND

Field

Exemplary embodiments relate to a mesh-type electrode pattern, a formation method of an electrode pattern, and a touch panel including an electrode pattern.

Discussion of the Background

An electronic device, such as a liquid crystal display (LCD), an organic light emitting diode (OLED) display, and an electrophoretic display, may include a touch sensing function so that a user may interact with the electronic device. A touch sensing function may determine whether a user's finger, stylus, etc., touches a screen and touch position information thereof, by sensing a change of pressure, light, etc., which may occur on the screen of the display device when the user's finger or a stylus contacts the screen to write a character or draw a picture.

The touch sensing function of the electronic devices may be realized through a touch sensor. The touch sensor may be classified into various types, such as a resistive type, a capacitive type, an electro-magnetic (EM) type, and an optical type.

In the capacitive type, a capacitive touch sensor may include a sensing capacitor formed by a sensing electrode. The sensing electrode may sense a change in capacitance of the sensing capacitor and transfer a sensing signal when a conductor such as a finger approaches the touch sensor so as to determine existence of a touch, a touch position, and the like. The capacitive touch sensor may include touch electrodes disposed in a touch sensing region and touch wires connected to the touch electrodes. The touch wires may transmit a sensing input signal to the touch electrode and transmit a sensing output signal of the touch electrode, which may be generated depending on the touch, to a touch driver.

The touch sensor may be installed in a display device (an in-cell type), formed on an outer surface of a display device (an on-cell type), or attached on a separate touch sensor panel that may be attached to a display device (an add-on cell type). The panel in which the touch sensor is formed may be referred as a touch panel.

When manufacturing an electronic device such as the touch panel, a glass substrate may be used. Due to heavy and fragile nature of the glass substrate, portability thereof may be lowered, and implementation of the electronic device in a large-size screen display may be difficult. Accordingly, a flexible electronic device, which may be light, withstand impact, and utilizes a plastic substrate having a high flexibility such as polyamide (PI), is being actively researched. In the flexible electronic device, a flexible touch sensor device may include a portion that may be bendable, foldable, rollable, stretchable in at least one direction, or elastic and transformable. Accordingly, an electrode pattern included in the flexible electronic device may include a conductive material having flexibility. For example, the electrode pattern may include at least one of a metal nanowire, a conductive polymer such as poly(3,4-ethylenedioxythiophene) (PEDOT), a metal mesh, a carbon nanotube (CNT), and a conductive material, such as a thin metal layer. The electrode pattern may have a predetermined transmittance to transmit light.

The electrode pattern included in the electronic device, such as the touch sensor, may be a mesh-type, which may have a regular or irregular arrangement. In case of a regularly arranged mesh-type, since the mesh-type has a predetermined space frequency component, when the electrode pattern is attached to the display device, directly formed in the display device, or adhered outside the display device to be folded on the display device, the mesh-type may generate a moiré phenomenon along with other periodic patterns (e.g., a black matrix) included in the display device, which may deteriorate visibility therein. In case of an irregularly arranged mesh-type, a size of a polygon formed by the electrode pattern, that is, the size of an opening, may not be uniform throughout the electrode pattern, such that luminance of light passing through a layer in which the electrode pattern is formed may not be uniform on some regions thereof, such that a dark spot may be recognized by a user.

The above information disclosed in this Background section is only for enhancement of understanding of the background of the inventive concept, and, therefore, it may contain information that does not form the prior art that is already known in this country to a person of ordinary skill in the art.

SUMMARY

Exemplary embodiments provide a mesh-type electrode pattern of an electrode layer with improved visibility by providing a uniform luminance of light passing therethrough.

Exemplary embodiments also provide a display device including an electrode pattern that displays an image having a uniform brightness.

Additional aspects will be set forth in the detailed description which follows, and, in part, will be apparent from the disclosure, or may be learned by practice of the inventive concept.

An exemplary embodiment discloses an electrode pattern including unit patterns having a mesh-shape, the unit patterns connected to each other and including a first unit pattern and a second unit pattern, in which each of the first and second unit patterns includes sides connected to each other, an area of the first unit pattern is smaller than an area of the second unit pattern, and at least one side of the first unit pattern has a line width smaller than a line width of one side of the second unit pattern.

An exemplary embodiment discloses an electrode pattern including unit patterns having a mesh-shape, the unit patterns connected to each other and including a first unit pattern and a second unit pattern, in which each of the first and second unit patterns includes sides connected to each other, an angle formed by two adjacent sides of the first unit pattern is smaller than an angle formed by two adjacent sides of the second unit pattern, and at least one of the two adjacent sides of the first unit pattern has a line width smaller than a line width of one of the two adjacent sides of the second unit pattern.

An exemplary embodiment also discloses a touch panel including a first substrate, and an electrode pattern disposed on a first surface the first substrate, the electrode pattern including irregular polygonal unit patterns connected to each other, in which the irregular polygonal unit patterns have a mesh-shape and includes a first unit pattern and a second unit pattern, each of the first and second unit patterns includes sides connected to each other, an area of the first unit pattern is smaller than an area of the second unit pattern, and at least one side of the first unit pattern has a line width smaller than a line width of one side the second unit pattern.

An exemplary embodiment further discloses a method for forming an electrode pattern including determining a shape of an irregular electrode pattern, the irregular electrode pattern including a unit pattern, calculating an area of the unit pattern, comparing the area of the unit pattern with a reference value, reducing a line width of at least one side of the unit pattern, when the area of the unit pattern is smaller than the reference value, and forming the electrode pattern on a first surface of a first substrate according to the shape and the line width of the unit pattern.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

DETAILED DESCRIPTION OF THE ILLUSTRATED EMBODIMENTS

Figure 1:
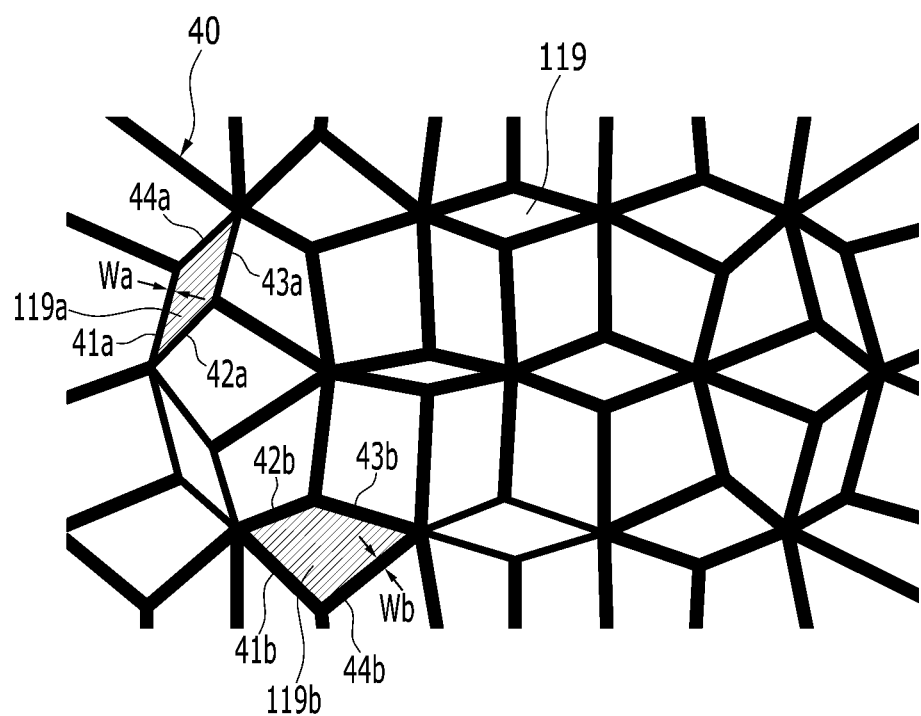
FIG. 1 is a top plan view of an electrode pattern according to an exemplary embodiment.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Various exemplary embodiments are described herein with reference to sectional illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 2:
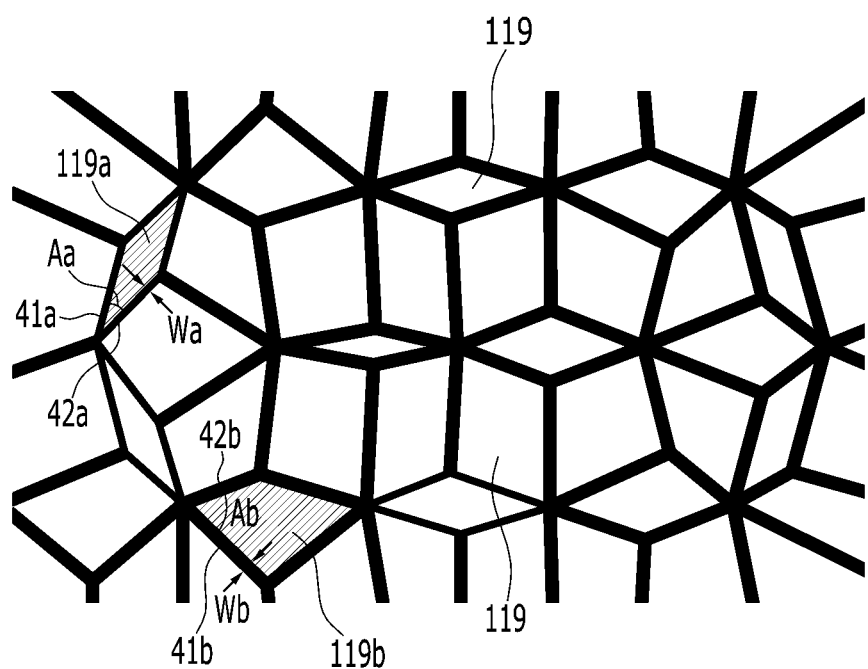
FIG. 2 is a top plan view of an electrode pattern according to an exemplary embodiment.

An electrode pattern according to an exemplary embodiment will be described with reference to FIG. 1 and FIG. 2. FIG. 1 and FIG. 2 are top plan views of an electrode pattern according to an exemplary embodiment.

Referring to FIG. 1 and FIG. 2, an electrode pattern 40 according to an exemplary embodiment may be a mesh-type and include unit patterns 119 that are connected to each other. The unit patterns 119 may be polygons, of which sides thereof are connected to each other. The electrode pattern 40 may include unit patterns 119 including at least two different polygons, or unit patterns 119 of the same shape. FIG. 1 and FIG. 2 illustrate the unit patterns 119 as quadrangles, however, the shape and/or the size of each unit pattern 119 may vary.

A first unit pattern 119a of the unit patterns 119 may include a first side 41a, a second side 42a, a third side 43a, and a fourth side 44a. A second unit pattern 119b of the unit patterns 119 has a different shape and/or size from the first unit pattern 119a, and includes a first side 41b, a second side 42b, a third side 43b, and a fourth side 44b. A line width of sides configuring one unit pattern 119 may be uniform, or line widths of at least two sides configuring one unit pattern 119 may be different from each other.

Two adjacent unit patterns 119 may be adjacent to each other via a common side or a common vertex interposed therebetween. The electrode pattern 40 may include at least one metal of copper (Cu), aluminum (Al), gold (Au), silver (Ag), titanium (Ti), palladium (Pd), and chromium (Cr).

Referring to FIG. 1, when an area of one unit pattern 119 according to the present exemplary embodiment is smaller than a predetermined value, at least one side of the unit pattern 119 may have a line width that is smaller than a line width of one side of a unit pattern 119 having an area greater than the predetermined value. The area of a unit pattern 119 may refer to an area of the polygon enclosed by the sides of one unit pattern 119.

More particularly, when an area of the first unit pattern 119a is smaller than a predetermined value and an area of the second unit pattern 119b is greater than the predetermined value, at least one sides 41a, 42a, 43a, and 44a of the first unit pattern 119a has a line width Wa smaller than a line width Wb of one side 41b, 42b, 43b, and 44b of the second unit pattern 119b. All of the sides 41b, 42b, 43b, and 44b of the second unit pattern 119b may have the line width Wb substantially the same to each other, or the line width of at least two sides may be different from the line width of the remaining sides. FIG. 1 illustrates the line width Wa of all of the sides 41a, 42a, 43a, and 44a of the first unit pattern 119a is smaller than the line width Wb of one side 41b, 42b, 43b, or 44b of the second unit pattern 119b, and the all sides 41b, 42b, 43b, and 44b of the second unit pattern 119b have substantially the same line width Wb.

The unit pattern 119a having a relatively small area has an opening of a smaller area, and a density of the electrode pattern 40 corresponding to the relatively small area may be higher than its surroundings, such that light transmittance thereof may be lower than the surroundings, which may be recognized as a dark spot. Accordingly, luminance of light passing through an electrode layer including the electrode pattern 40 may be non-uniformly recognized. According to an exemplary embodiment, at least one side of a unit pattern 119 having a relatively small area has a smaller line width, to increase an area of the unit pattern 119, that is, the opening. Accordingly, transmittance of light therethrough may be increased, such that luminance uniformity may be improved.

In order to equalize luminance (or improve non-uniformity) of transmitted light, a ratio of the line width Wa of the first unit pattern 119a having a relatively small area and the line width Wb of the second unit pattern 119b having a relatively large area may be controlled, by considering the area and the shape of the line width Wb and the unit pattern 119. For example, a ratio of the line width Wa of the first unit pattern 119a to the line width Wb of the second unit pattern 119b may be controlled to be in the range about 1:2.

Referring to FIG. 2, according to an exemplary embodiment, when an angle formed by two adjacent sides of the unit pattern 119 is smaller than a predetermined value, at least one of the two adjacent sides may have a line width smaller than a line width of two sides of a unit pattern 119, of which an angle formed by the two sides is greater than the predetermined value. For example, when an angle Aa formed by two adjacent sides of the first unit pattern 119a is smaller than the predetermined value and an angle Ab formed by two adjacent sides of the second unit pattern 119b is not smaller than the predetermined value, at least one of the two sides 41a and 42a of the first unit pattern 119a may have a line width Wa that is smaller than a line width Wb of one of the two sides 41b and 42b of the second unit pattern 119b. The line width Wb of the two sides 41b and 42b of the second unit pattern 119b may be substantially the same or different from one another. In FIG. 2, the line width Wa of the two sides 41a and 42a forming the angle Aa of the first unit pattern 119a is smaller than the line width Wb of the two sides 41b and 42b forming the angle Ab of the second unit pattern 119b, and the two sides 41b and 42b of the second unit pattern 119b have substantially the same line width Wb.

In an area formed by a relatively small angle with two adjacent sides of a unit pattern 119, a density of the electrode pattern 40 may be relatively higher and an opening area may be relatively lower, such that light transmittance therethrough may be relatively lower than its surroundings, which may be recognized as a dark spot. According to an exemplary embodiment, the opening area of the unit pattern 119 that has a relatively small area by an angle formed by two adjacent sides may be increased by reducing a line width of at least one sides of the unit patterns 119. Accordingly, light transmittance in the region of the unit patterns 119 having a relatively small angle formed by the two adjacent sides may be increased, thereby preventing a non-uniform luminance.

In order to equalize luminance (or improve non-uniformity) of transmitted light, a ratio of the line width Wa of the first unit pattern 119a, which has a relatively small angle formed by the two adjacent sides, and the line width Wb of the second unit pattern 119b, which has a relatively large angle formed by the adjacent sides, may be controlled by considering the area and the shape of the line width Wb and the unit patterns 119.

Hereinafter, a method of forming an electrode pattern according to an exemplary embodiment will be described with reference to FIG. 3, FIG. 4, FIG. 5, FIG. 6, FIG. 7, FIG. 8, FIG. 9, and FIG. 10.

Figure 3:
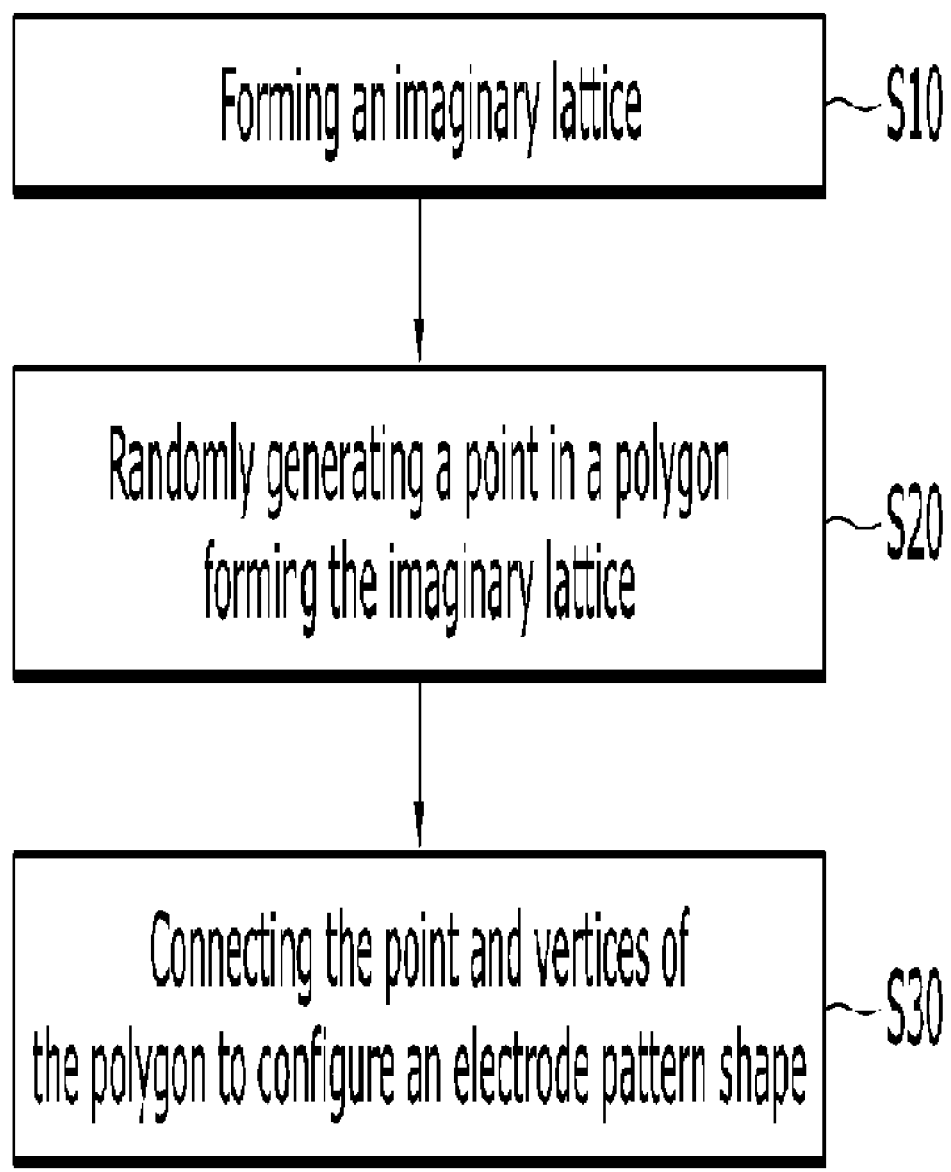
FIG. 3 is a flowchart illustrating a method of forming an electrode pattern according to an exemplary embodiment.
Figure 4:
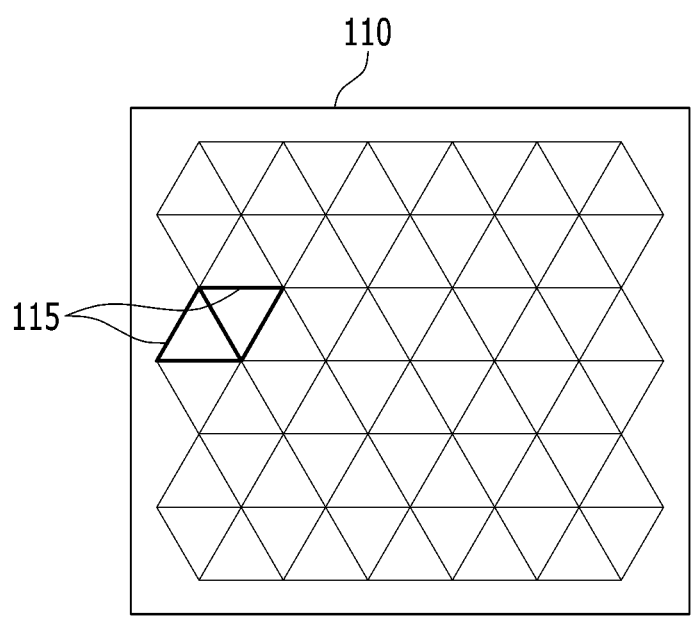
FIG. 4, FIG. 5, and FIG. 6 are top plan views sequentially showing a process forming an electrode pattern depending on a method of forming an electrode pattern, according to an exemplary embodiment.
Figure 5:
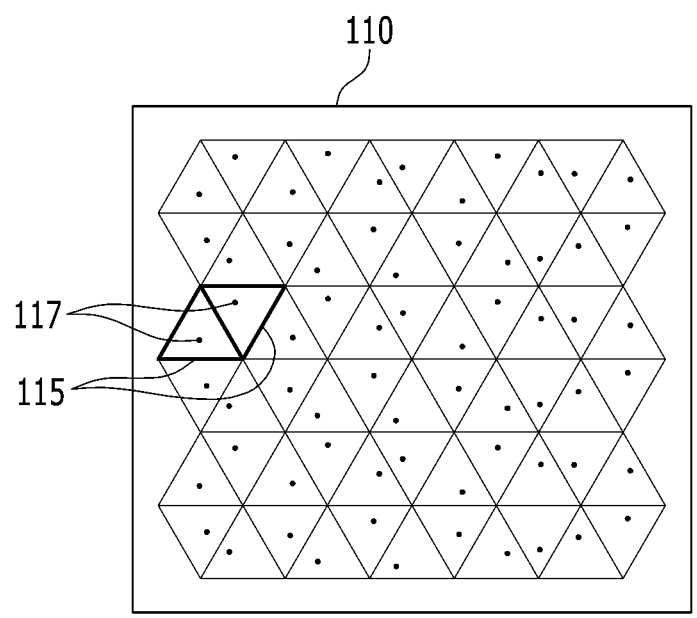
Figure 6:
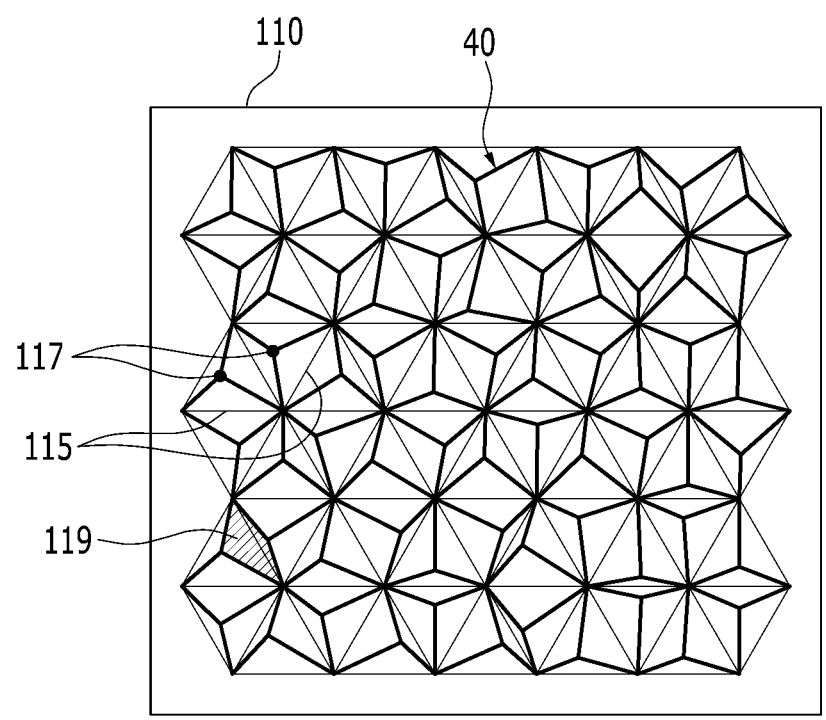
Figure 7:
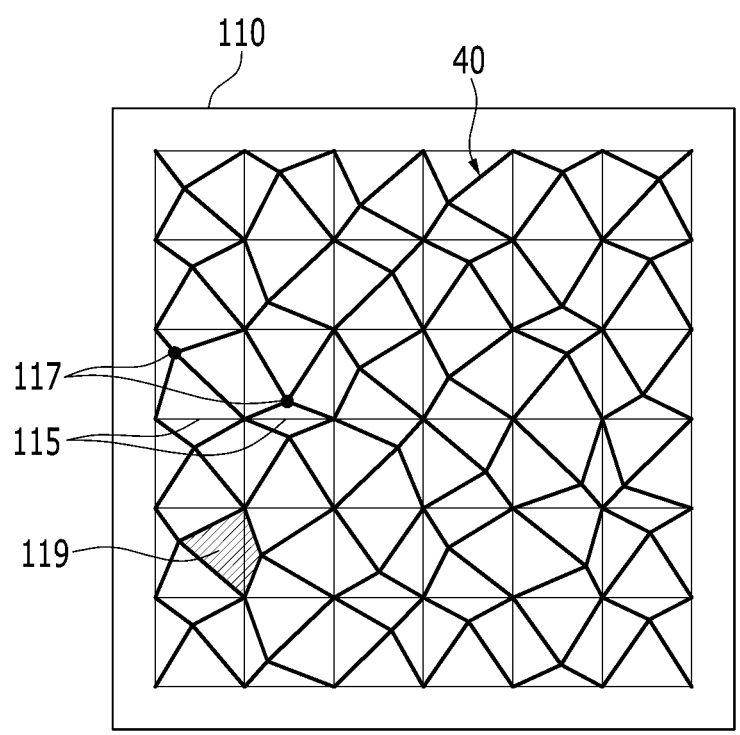
FIG. 7, FIG. 8, and FIG. 9 are top plan views of an electrode pattern according to an exemplary embodiment.
Figure 8:
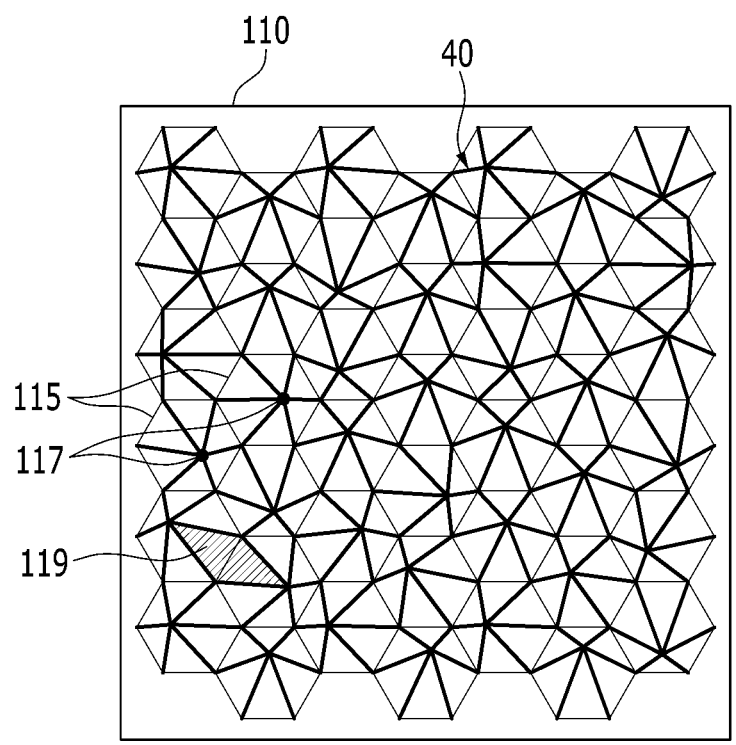
Figure 9:
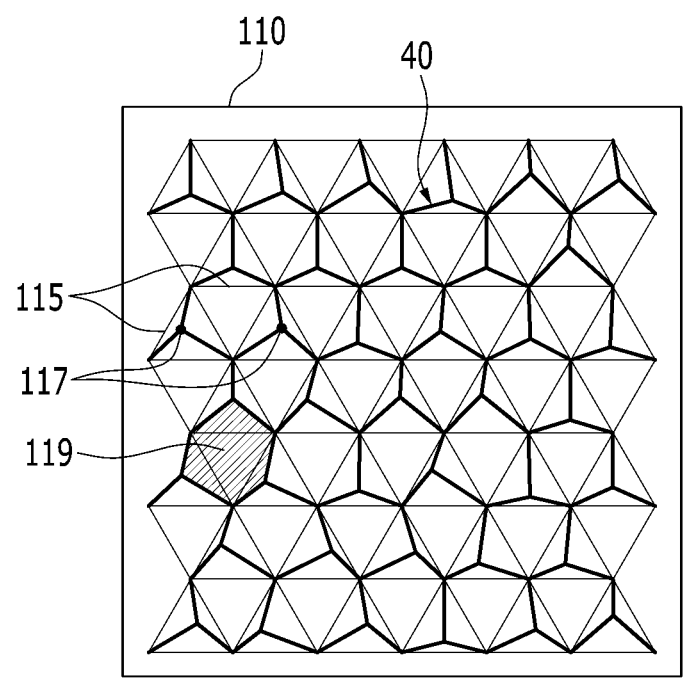
Figure 10:
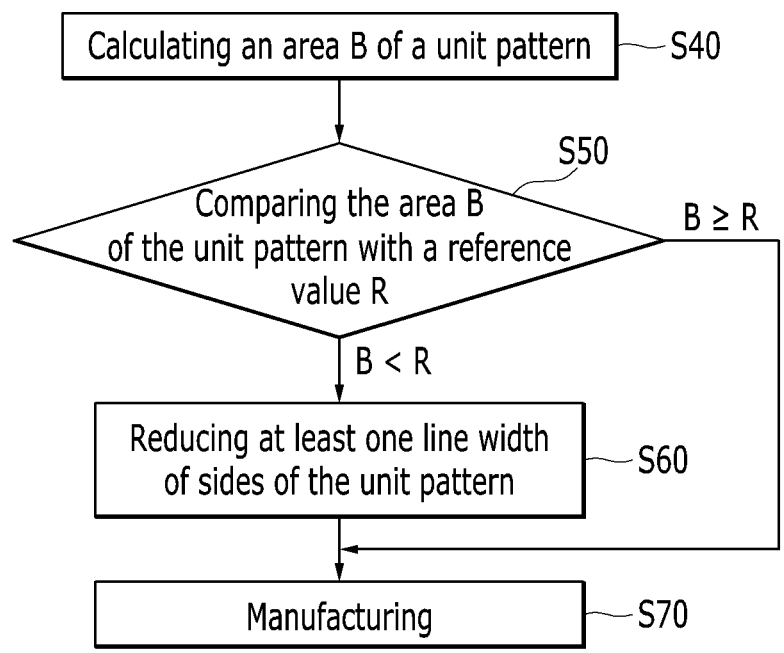
FIG. 10 is a flowchart illustrating a method of forming an electrode pattern, according to an exemplary embodiment, as a next step to the method of FIG. 3.

FIG. 3 is a flowchart showing a method of forming an electrode pattern according to an exemplary embodiment. FIG. 4, FIG. 5, and FIG. 6 are top plan views sequentially showing a process of forming an electrode pattern, depending on a method of forming an electrode pattern, according to an exemplary embodiment. FIG. 7, FIG. 8, and FIG. 9 are top plan views of an electrode pattern according to an exemplary embodiment. FIG. 10 is a flowchart showing a method of forming an electrode pattern, according to an exemplary embodiment, as a step following the method illustrated with reference to FIG. 3.

First, referring to FIG. 3 and FIG. 4, an imaginary lattice configured by polygons 115 is formed (S10). The shape and/or the size of the polygons 115 configuring the imaginary lattice may be the same to one another.

Next, referring to FIG. 3 and FIG. 5, points 117 are randomly generated inside imaginary polygons 115 (S20). The points 117 may be generated anywhere inside the polygons 115.

Next, referring to FIG. 3 and FIG. 6, vertices of the polygons 115 configuring the imaginary lattice and the points 117 are connected, to determine a schematic shape of the electrode pattern 40 (S30). In this case, line width of the sides of the electrode pattern 40 may be uniform and may have line width Wb, as described with reference to FIG. 2. The points 117 are randomly formed inside the polygons 115, such that the shape of the electrode pattern 40 formed by connecting the points 117 and the vertices of the polygons 115 may be random. The sides of the unit patterns 119 configuring the electrode pattern 40 may have random angles.

According to an exemplary embodiment, the polygons 115 configuring the imaginary lattice may be quadrangles, as shown in FIG. 7, or may be hexagons, as shown in FIG. 8.

According to an exemplary embodiment, the points 117 may not be formed in all polygons 115 configuring the imaginary lattice. Referring to FIG. 9, a point 117 may be generated only in one of two adjacent polygons 115. That is, a polygon 115 including the point 117 and a polygon 115 not including the point 117 may be alternately disposed along a vertical direction of the imaginary lattice.

Next, referring to FIG. 10, the area B of the unit patterns 119 configuring the electrode pattern 40 is calculated (S40). Next, the area B of the unit patterns 119 and a reference value R are compared (S50). When the area B of the unit patterns 119 is smaller than the reference value R, at least one line width of the sides of the unit patterns 119 is reduced (S60). When the area B of the unit patterns 119 is not smaller than the reference value R, the line width of the sides of the unit patterns 119 is not changed.

Alternatively, in step S50 of FIG. 10, an angle formed by the two adjacent sides of the unit patterns 119 may be compared to a reference value. In step S60, when the angle formed by the two adjacent sides of the unit pattern 119 is smaller than the reference value, a line width of the two corresponding sides of the unit patterns 119 may be reduced. When the angle formed by the two adjacent sides of the unit patterns 119 is not smaller than the reference value, the line width of the two corresponding sides of the unit patterns 119 may not be changed.

The mesh-type electrode pattern 40 according to an exemplary embodiment may be manufactured based on the line width determined through steps S40 to S60 (S70). The electrode pattern 40 may be formed by depositing a conductive material on the substrate and patterning the conductive material, or by various methods such as printing. Alternatively, the electrode pattern may formed during forming other electronic devices, such as a touch panel.

Since the shape and the angle formed by the sides of the unit patterns 119 configuring the electrode pattern 40 are random, even when the electrode pattern 40 is disposed on the display area of the display panel, the electrode pattern 40 may not generate the moiré phenomenon with periodic lattices, such as a black matrix of the display device, thereby improving visibility. Also, since the points 117 are disposed inside of the polygons 115 configuring the imaginary lattice, electric and optical characteristics of the electrode pattern 40, as well as an aperture ratio thereof, may be uniform on average.

Furthermore, as described above, in the region where the area of the unit patterns 119 or the angle formed by the sides of the unit patterns 119 is relatively smaller than a reference value, such that a density thereof may be relatively high, the line width of the corresponding sides may be reduced, thereby light transmittance may be increased and luminance of the transmitted light may be uniform.

Figure 11:
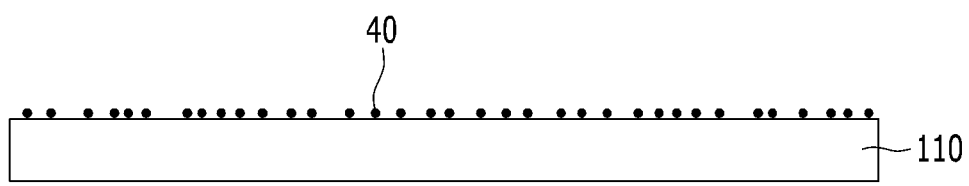
FIG. 11, FIG. 12, and FIG. 13 are cross-sectional views of an electronic device including an electrode pattern, according to an exemplary embodiment.

The electrode pattern 40 according to an exemplary embodiment may be formed in electronic devices, such as a touch panel. Referring to FIG. 11, according to an exemplary embodiment, the electrode pattern 40 may be formed on the substrate 110. The substrate 110 may be transparent and transmit light therethrough. The substrate 110 may include glass, plastic, etc., and may be bent or curved with flexibility.

Figure 12:
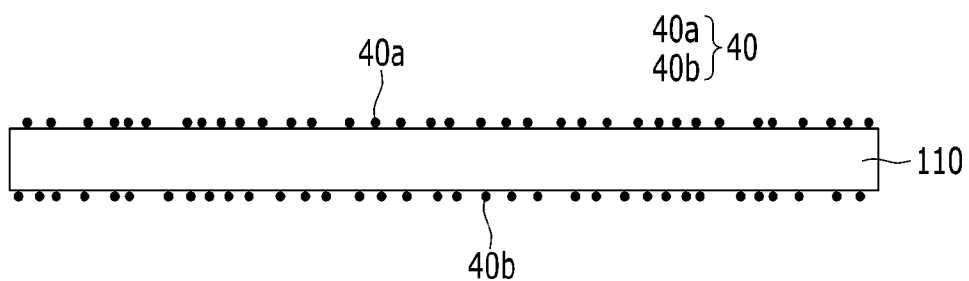

Referring to FIG. 12, according to an exemplary embodiment, the electrode pattern 40 may include an electrode pattern 40a formed on one surface of the substrate 110 and an electrode pattern 40b formed on the other surface of the substrate 110.

Figure 13:
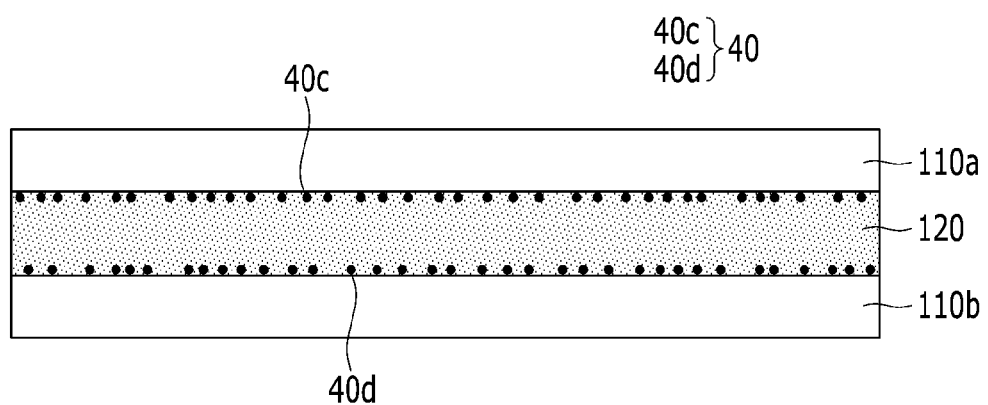

Referring to FIG. 13, according to an exemplary embodiment, the electrode pattern 40 may include an electrode pattern 40c formed on a first substrate 110a and an electrode pattern 40d formed on a second substrate 110b. The first substrate 110a and the second substrate 110b may be adhered to each other by an adhesive layer 120, such that the electrode pattern 40c and the electrode pattern 40d may face each other.

Hereinafter, a touch panel including the electrode pattern 40 will be described.

Figure 14:
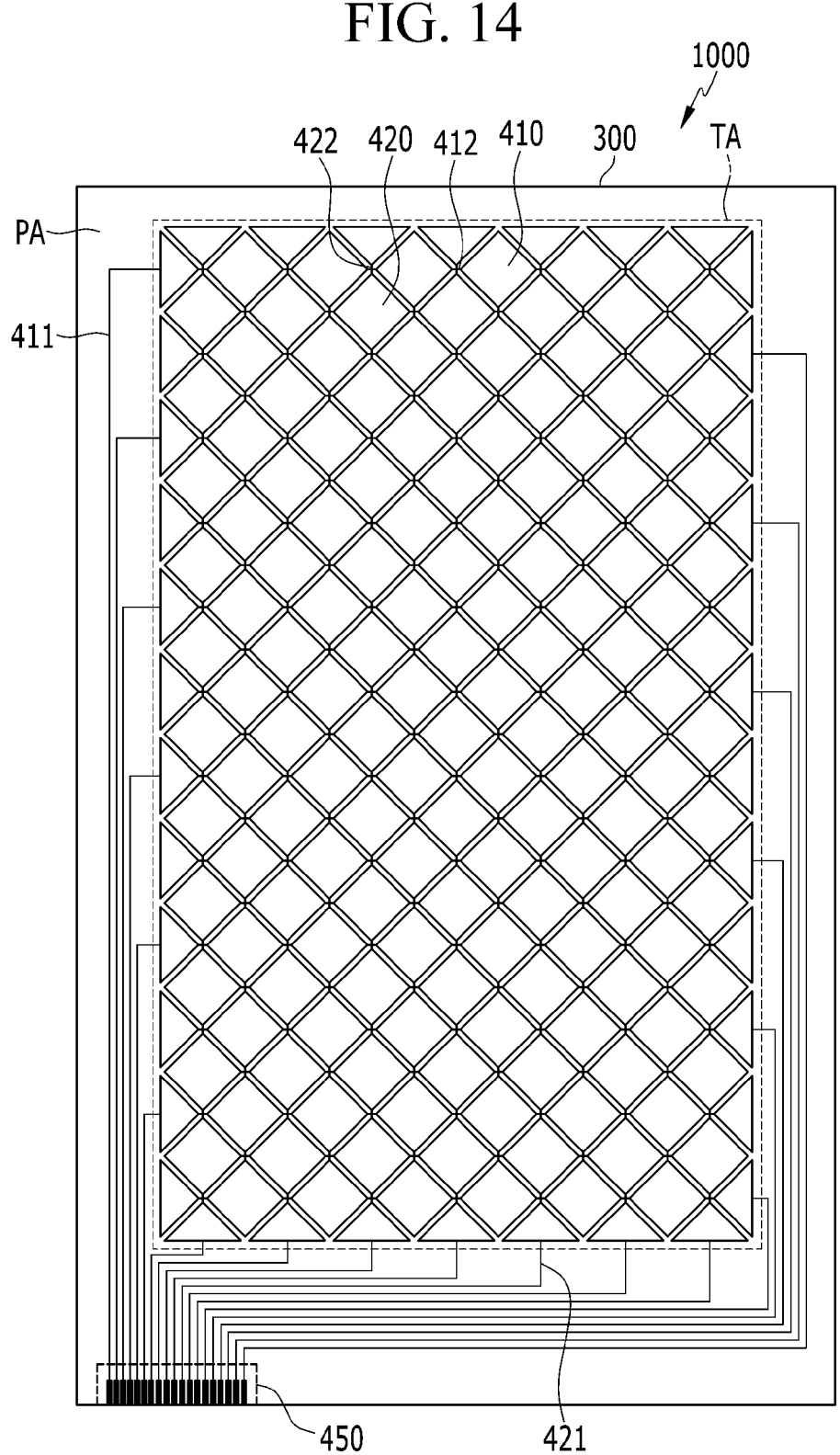
FIG. 14 is a top plan view of a touch panel according to an exemplary embodiment.
Figure 15:
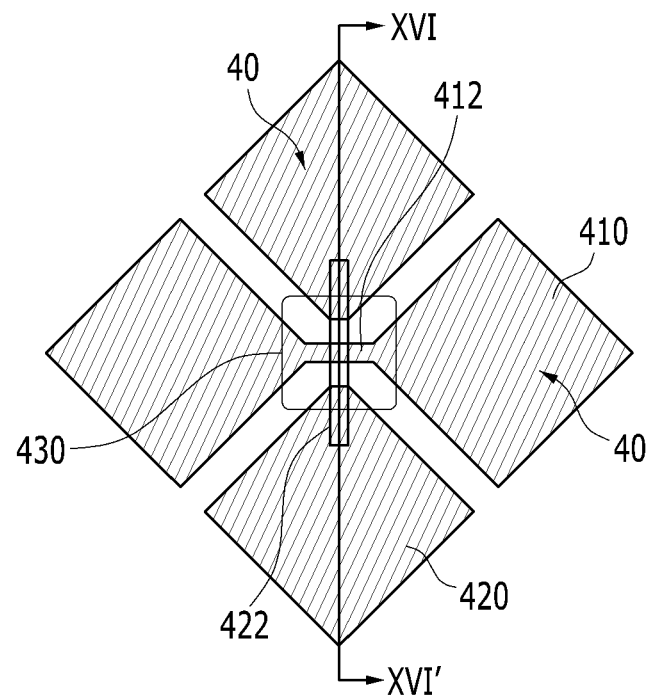
FIG. 15 is an enlarged view of a portion of the touch panel of FIG. 14.
Figure 16:
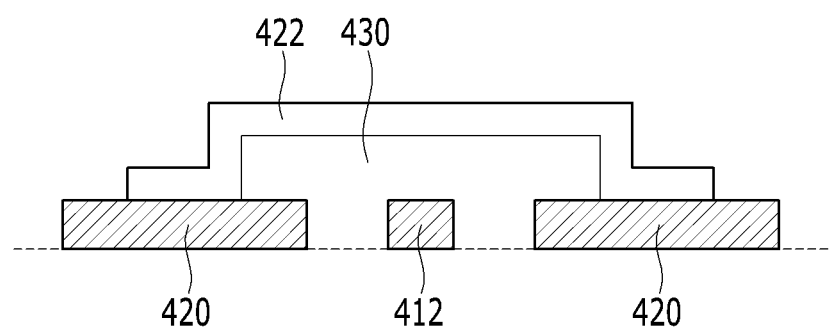
FIG. 16 is a cross-sectional view of the touch panel of FIG. 15, taken along section line XVI-XVI'.

FIG. 14 is a top plan view of a touch panel according to an exemplary embodiment. FIG. 15 is an enlarged view of a portion of the touch panel of FIG. 14. FIG. 16 is a cross-sectional view of the touch panel of FIG. 15, taken along line XVI-XVI'.

Referring to FIG. 14, a touch panel 1000 according to an exemplary embodiment includes a touch area TA and a peripheral area PA surrounding the touch area TA.

The touch area TA may include a touch sensor and sense a touch when an external object contacts a touch surface.

The contact may include a case when the external object approaches the touch surface or hovers around the touch surface, and when the external object, such as a user's finger, directly contacts the touch surface.

The touch sensor may sense the contact through various methods. The touch sensor may be classified into various types, such as a resistive type, a capacitive type, an electromagnetic type, and an optical type. In exemplary embodiments, a capacitive touch sensor will be described as an example.

The touch panel 1000 includes touch electrodes disposed in the touch region TA. The touch electrodes may include first touch electrodes 410 and second touch electrodes 420. The first touch electrodes 410 and the second touch electrodes 420 are alternately disposed and not to substantially overlap each other in the touch region TA. The first and second touch electrodes 410 and 420 may be disposed in a column direction and a row direction. The first touch electrode 410 and the second touch electrode 420 may be substantially disposed on the same layer.

The first touch electrodes 410 arranged in the same column or row may be connected to each other, or may be separated from each other inside or outside the touch region TA. The second touch electrodes 420 arranged in the same column or row may be connected to each other, or may be separated from each other inside or outside the touch region TA. When the first touch electrodes 410 disposed in the same row are connected inside the touch region TA, the second touch electrodes 420 disposed in the same column may be connected to each other in the touch region TA.

The first touch electrodes 410 disposed in each row are connected through a first connection 412 and the second touch electrodes 420 disposed in each column are connected through a second connection 422. Referring to FIG. 15 and FIG. 16, the first connection 412 connecting the adjacent first touch electrodes 410 to each other may be disposed on the same layer as the first touch electrode 410, and may include the same material as the first touch electrode 410. That is, the first touch electrode 410 and the first connection 412 may be integrally formed and patterned simultaneously. The second connection 422 connecting the adjacent second touch electrodes 420 to each other may be disposed at a different layer from the second touch electrode 420. That is, the second touch electrode 420 and the first connection 412 may be separated from each other and patterned separately. The second touch electrode 420 and the second connection 422 may be connected through direct contact.

An insulating layer 430 is disposed between the first connection 412 and the second connection 422 and insulate the first connection 412 and the second connection 422. The insulating layer 430 may be an insulator having an island shape and disposed at each crossing portion of the first connection 412 and the second connection 422. Alternatively, the insulating layer 430 may be formed on the entire surface of the substrate 110, and a portion of the insulating layer 430 disposed on the second touch electrode 420 may be removed to connect the adjacent second touch electrodes 420 in the column direction.

The first touch electrodes 410 connected to each other in each row are connected to a first touch wiring 411, and the second touch electrodes 420 connected to each other in each column are connected to a second touch wiring 421. The first touch wiring 411 and the second touch wiring 421 may be disposed in the peripheral area PA of the substrate 110 or may be positioned in the touch region TA. End portions of the first and second touch wirings 411 and 421 may form a pad portion 450 in the peripheral area PA.

The first touch electrode 410 and the second touch electrode 420 include the electrode pattern 40 according to the exemplary embodiments and may have a predetermined transmittance.

The first and second touch electrodes 410 and 420 adjacent to each other form the touch sensor including a mutual sensing capacitor. A sensing input signal is input via one of the first and second touch electrodes 410 and 420, and a change of charges due to a contact of an external object may be output as a sensing output signal via the other one of the first and second touch electrodes 410 and 420.

According to an exemplary embodiment, the first touch electrodes 410 and the second touch electrodes 420 may be separated from each other and respectively connected to the touch wiring (not shown). In this case, each of the first and second touch electrodes 410 and 420 may form a self-sensing capacitor that serves as the touch sensor. The self-sensing capacitor may be charged with a predetermined amount of charges by receiving a sensing input signal, and when a contact from the external object such as a finger occurs, the amount of charges thereof may be changed to output a sensing output signal that may be different from the received sensing input signal.

The touch panel 1000 may include a substrate 300. The touch electrodes and the touch wiring connected thereto may be positioned on the substrate 300. The substrate 300 may be an upper substrate or the upper layer included in a display panel of a display device, or a substrate separated from the display panel. When the substrate 300 is the substrate included in the display panel, the touch electrode may be built in the display panel or directly patterned on an outer surface of the display panel. When the substrate 300 is separated from a substrate included in the display panel, the touch panel 1000 may be adhered to the outer surface of the display panel. The touch region TA including the touch electrode may overlap an image display area of the display panel. An image displayed by the display panel may be recognized through the touch panel 1000.

According to an exemplary embodiment, the touch electrode forming the touch sensor includes the electrode pattern 40, which includes the unit patterns 119 having random shapes. Accordingly, the moiré phenomenon may be prevented. Also, by controlling the line width of the unit patterns 119 depending on the density of the electrode pattern, a brightness of the image observed through the touch panel 1000 may be uniform and dark spots may be prevented from being recognized, thereby improving visibility of the display panel.

Thus, in an exemplary embodiment of the present inventive concept, luminance of light passing through an electrode layer including a mesh-type electrode pattern may be uniform, and brightness of an image displayed by a display device including the electrode pattern may be uniform, thereby improving visibility.

Although certain exemplary embodiments and implementations have been described herein, other embodiments and modifications will be apparent from this description. Accordingly, the inventive concept is not limited to such exemplary embodiments, but rather to the broader scope of the presented claims and various obvious modifications and equivalent arrangements.

What is claimed is:
1. An electrode pattern, comprising:
unit patterns having a mesh-shape, the unit patterns connected to each other, wherein:
each of the unit patterns comprises sides connected to each other;
the unit patterns are divided into a first group in which each of the unit patterns has an area that is smaller than a predetermined value, and a second group in which each of the unit patterns has an area that is greater than the predetermined value; and
at least one side of each of the unit patterns of the first group has a line width smaller than a line width of a side of the unit pattern of the second group.

2. The electrode pattern of claim 1, wherein each of the unit patterns has an irregular shape.

3. The electrode pattern of claim 2, wherein each of the unit patterns has a polygonal shape.

4. The electrode pattern of claim 3, wherein line widths of all of the sides of the unit patterns of the first group are substantially the same.

5. An electrode pattern, comprising:
unit patterns having a mesh-shape, the unit patterns connected to each other,
wherein:
each of the unit patterns comprises sides connected to each other;
the unit patterns are divided into a first group in which each of the unit patterns has an angle formed by two adjacent sides that is smaller than a predetermined value, and a second group in which each of the unit patterns has an angle formed by two adjacent sides that is greater than the predetermined value; and
at least one of the two adjacent sides of the unit pattern of the first group has a line width smaller than a line width of any of the two adjacent sides of the second unit pattern of the second group.

6. The electrode pattern of claim 5, wherein each of the first and second unit patterns has an irregular shape.

7. The electrode pattern of claim 6, wherein each of the first and second unit patterns has a polygonal shape.

8. The electrode pattern of claim 7, wherein a line width of each of the sides of the unit patterns of the first group is substantially the same with each other.

9. A touch panel, comprising:
a first substrate; and
an electrode pattern disposed on a first surface the first substrate, the electrode pattern comprising irregular polygonal unit patterns connected to each other,
wherein:
the irregular polygonal unit patterns have a mesh-shape;
each of the irregular polygonal unit patterns comprises sides connected to each other;
the irregular polygonal unit patterns are divided into a first group in which each of the irregular polygonal unit patterns has an area that is smaller than a first predetermined value, and a second group in which each of the irregular polygonal unit patterns has an area that is greater than the first predetermined value; and
at least one side of the irregular polygonal unit pattern of the first group has a line width smaller than a line width of a side of the irregular polygonal unit pattern of the second group.

10. The touch panel of claim 9, wherein:
when an angle formed by two adjacent sides of the irregular polygonal unit pattern of the first group is smaller than a second predetermined value, and an angle formed by two adjacent sides of the irregular polygonal unit pattern of the second group is greater than the second predetermined value,
at least one of the two adjacent sides of the irregular polygonal unit pattern of the first group has a line width smaller than a line width of any of the two adjacent sides of the irregular polygonal unit pattern of the second group.

11. The touch panel of claim 10, wherein line widths of all of the sides of the irregular polygonal unit pattern of the first group are substantially the same.

12. The touch panel of claim 11, wherein the electrode pattern is disposed on a second surface of the first substrate opposing the first surface.

13. The touch panel of claim 11, further comprising a second substrate,
wherein:
the electrode pattern is disposed on a first surface of the second substrate; and
the first surface of the first substrate and the first surface of the second substrate are adhered to face each other by an adhesive film.

14. A method for forming an electrode pattern, the method comprising:
determining a shape of an irregular electrode pattern, the irregular electrode pattern comprising a unit pattern;
calculating an area of the unit pattern;
comparing the area of the unit pattern with a reference value;
reducing a line width of at least one side of the unit pattern, when the area of the unit pattern is smaller than the reference value; and
forming the electrode pattern on a first surface of a first substrate according to the shape and the line width of the unit pattern,
wherein the line width of each sides of the unit pattern is maintained, when the area of the unit pattern is equal to or greater than the reference value.

15. The method of claim 14, wherein:
a line width of each sides of the irregular electrode pattern is uniform, in determining the shape of the irregular electrode pattern.

16. The method of claim 14, wherein determining the shape of the irregular electrode pattern comprises:
forming an imaginary lattice comprising polygons;
randomly generating points in the polygons, and connecting the points to vertices of the polygons.

17. The method of claim 16, wherein a point of the points is generated in only one of two adjacent polygons disposed along a first direction.

18. The method of claim 16, further comprising:
forming the electrode pattern on a second surface of the first substrate opposing the first surface.

19. The method of claim 16, further comprising:
forming the electrode pattern on a first surface of a second substrate; and
adhering the first surface of the first substrate and the first surface of the second substrate to face each other.

* * * * *